US005708438A

United States Patent [19]
Tanaka et al.

[11] Patent Number: 5,708,438
[45] Date of Patent: Jan. 13, 1998

[54] ANGULAR VELOCITY CALCULATING APPARATUS FOR NAVIGATION APPARATUS

[75] Inventors: Tamiya Tanaka; Masashi Ohkubo, both of Kanagawa; Katsuhiko Nunokawa, Chiba, all of Japan

[73] Assignee: Sony Corporation, Japan

[21] Appl. No.: 559,154

[22] Filed: Nov. 17, 1995

[30] Foreign Application Priority Data

Nov. 25, 1994 [JP] Japan .................................. 6-315468

[51] Int. Cl.$^6$ .............................. G01S 13/50; G01S 13/60
[52] U.S. Cl. .......................... 342/104; 342/106; 342/117
[58] Field of Search ................................ 342/104, 106, 342/114, 115, 117

[56] References Cited

U.S. PATENT DOCUMENTS

| | | | |
|---|---|---|---|
| 4,706,092 | 11/1987 | Magne | 342/109 |
| 4,911,548 | 3/1990 | Keren-Gill | 342/126 X |
| 4,939,522 | 7/1990 | Newstead et al. | 342/387 |
| 5,016,017 | 5/1991 | Kodera et al. | 342/106 |
| 5,072,396 | 12/1991 | Fitzpatrick et al. | 364/450 |
| 5,130,709 | 7/1992 | Toyama et al. | 340/995 |
| 5,374,931 | 12/1994 | Wiener | 342/115 |
| 5,504,569 | 4/1996 | Kato et al. | 342/104 X |
| 5,563,601 | 10/1996 | Cataldo | 342/25 |
| 5,579,012 | 11/1996 | Iwakuni et al. | 342/117 |

*Primary Examiner*—John B. Sotomayor
*Attorney, Agent, or Firm*—Ronald P. Kananen

[57] ABSTRACT

An angular velocity calculating apparatus which is low-priced and capable of obtaining an angular velocity with high accuracy is realized. Two velocity detectors which are substantially small in offset error, noise, or the like, unlike the conventionally employed gyroscope, is disposed at portions on the moving matter or in the vicinity thereof, and the angular velocity is obtained on the basis of the velocity information obtained from these detectors. Accordingly, the angular velocity calculating apparatus and a navigation apparatus can be realized which is higher in accuracy and cheaper as compared with the conventional ones.

12 Claims, 3 Drawing Sheets

5,708,438

ANGULAR VELOCITY CALCULATING APPARATUS FOR NAVIGATION APPARATUS

BACKGROUND OF THE INVENTION

1. Field of the Invention

This invention relates to an angular velocity calculating apparatus for a navigation apparatus and, more particularly, is applicable to a position detecting unit of a navigation apparatus.

2. Description of the Related Art

At present, a navigation system is commercially available which reads data from a map recorded in a CD-ROM to superimpose a current position of a vehicle on the map and display them on a display. Most of such a navigation system utilizes a receiver for a global positioning system (GPS) as a position detecting means. The receiver for the GPS cannot obtain positional information at a location where the receiver can not directly receive radio waves from a satellite, such as the back of a building in town and in a tunnel. Moreover, although the receiver for the GPS can receive radio waves, the receiver cannot obtain positional information with a sufficient accuracy when a vehicle mounting the navigation system moves at a low velocity.

There have been proposed various means for obtaining positional information accurately at such a location where the receiver for the GPS cannot obtain positional information accurately. There is a sensor for obtaining an angular velocity as one of such means. As such a kind of sensor, there have been proposed a vibration gyroscope, optical fiber gyroscope, geomagnetic sensor, gas rate sensor, etc.

However, such sensors exhibit the following advantages and disadvantages, and hence have been insufficient as measuring means satisfying both low cost and high accuracy. For example, the vibration gyroscope has advantages of small size and low cost but has disadvantage that an offset value changes. The optical fiber gyroscope is high in accuracy but has disadvantage of high cost. The geomagnetic sensor is able to obtain absolute azimuth or orientation but is disadvantageous in that the sensor is likely influenced by external noise. The gas rate sensor is disadvantageous in that the senor takes a long time upon starting the operation thereof.

SUMMARY OF THE INVENTION

In view of the foregoing, an object of this invention is to provide an angular velocity calculating apparatus which is able to calculate an angular velocity always with high accuracy and has a low cost, and to provide a navigation apparatus using the angular velocity calculating apparatus.

The foregoing objects and other objects of the invention have been achieved by the provision of an angular velocity calculating apparatus with velocity detector, comprising: plural velocity detectors for detecting velocity of a moving matter respectively; a processing means for processing pre-calculation of an angular velocity; and an angular velocity calculating means for calculating an angular velocity, combined with the processing means.

Further, according to this invention, a navigation apparatus for a mobile vehicle comprises: plural velocity detectors for detecting velocity of a moving matter respectively; a processing means for processing pre-calculation of an angular velocity; an angular velocity calculating means for calculating an angular velocity, combined with the processing means; a velocity calculating means for calculating a velocity, combined with the plural velocity detectors; a digital storage means for storing digital map data; a display means for displaying a map and a position of the vehicle on the map; and a central processing unit for calculating a position of a vehicle, combined to the angular velocity calculating means and the velocity calculating means, for reading digital map data from the digital storage means, and for generating an output signal to the display means.

Furthermore, according to this invention, the angular velocity calculating method comprises the steps of: a velocity detecting step detecting velocity at plural positions of a moving matter respectively; a processing step processing pre-calculation of an angular velocity; and an angular velocity calculating step calculating an angular velocity.

As described above, according to the present invention, the velocity detector which is substantially small in offset error, noise, or the like unlike the conventionally employed sensors such as the gyroscope, is disposed at portions on the moving matter or in the vicinity thereof, and the angular velocity is obtained on the basis of the velocity information obtained from these means. Therefore, the angular velocity calculating apparatus can be realized which is substantially small in offset error, noise, or the like unlike the conventionally employed gyroscope and is higher in accuracy and cheaper as compared with the conventional ones.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

(1) Entire Configuration

Figure 1:
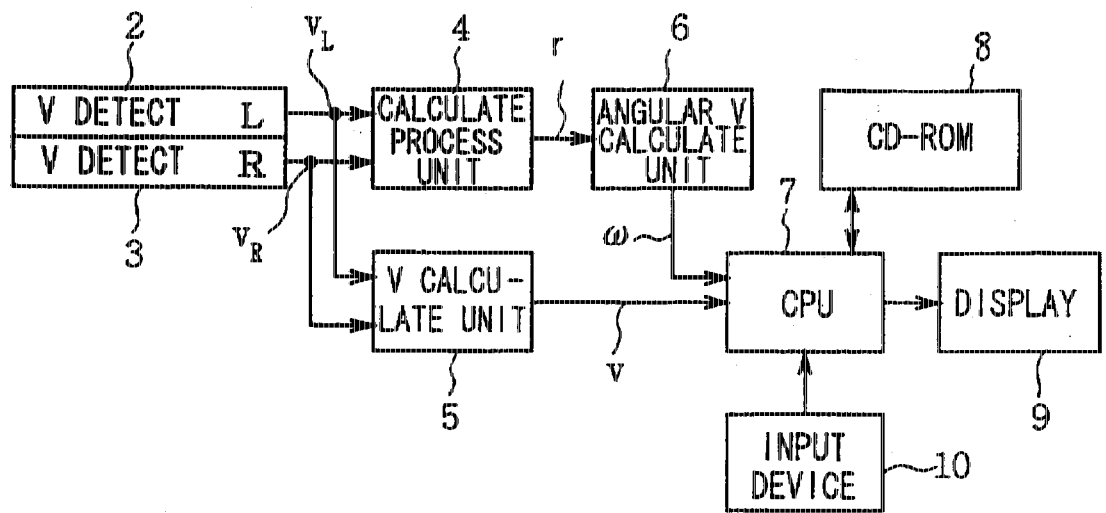
FIG. 1 is a block diagram showing an embodiment of an angular velocity calculating apparatus and a navigation apparatus according to the present invention.

FIG. 1 shows an example of configuration of a navigation apparatus which detects an angular velocity of a moving matter on the basis of velocity information obtained from two portions on the moving matter or in the vicinity of the moving matter, and calculates the current position on the basis of the detected angular velocity to display the current position on a map.

Figure 2:
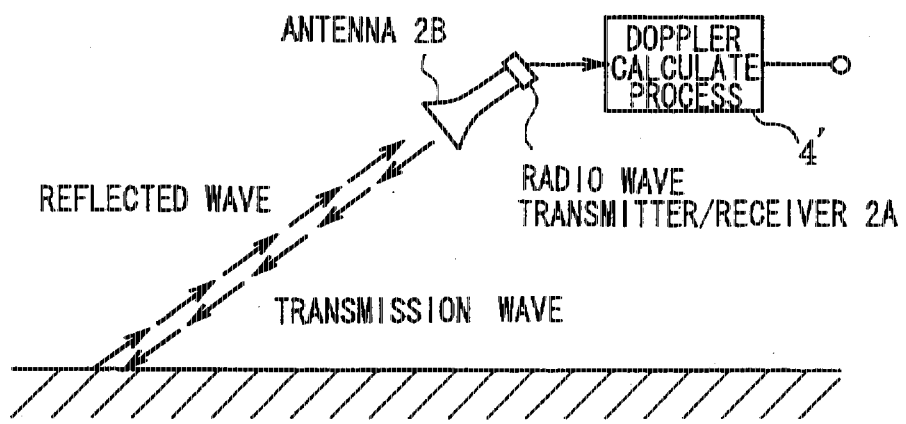
FIG. 2 is a block diagram showing an example of a velocity detector.

In the case of this example, a pair of velocity detectors 2 and 3 used for detecting velocity information are mounted at the front portion of the moving matter such that they are slightly separated from each other and are positioned symmetrically with respect to a center line passing through the center of the moving matter. Various measuring means may be employed as the velocity detectors 2 and 3. In this example, a radio wave transmitter/receiver 2A, an antenna 2B, and a Doppler calculation processing unit 4' shown in FIG. 2 are employed. These are devices for detecting the difference between the frequency of a transmission wave and the frequency of a reflected wave by Doppler effect and obtaining a relative velocity from the difference of the frequency.

The velocity information $v_L$ and $v_R$ measured by the velocity detectors 2 and 3 are supplied to a calculation processing unit 4 and a velocity calculating unit 5. The calculation processing unit 4 obtains, in accordance with the procedure shown in FIG. 3, various kinds of variables which are necessary at the time of obtaining an angular velocity $\omega$ by using the inputted velocity information $v_L$ and $v_R$, and then outputs the variables to an angular velocity calculating unit 6. The angular velocity calculating unit 6 calculates the angular velocity $\omega$ on the basis of the various kinds of variables inputted thereto and supplies the obtained angular velocity to a CPU 7.

The velocity calculating unit 5 obtains a mean value of the velocity information $v_L$ and $v_R$ as the moving velocity "v". The moving velocity "v" of the moving matter is input to the CPU 7 in addition to the angular velocity $\omega$.

The CPU 7 specifies moving direction and a moving distance or the like of the moving matter relative to the position of the moving matter at the time of the preceding measurement on the basis of the moving velocity "v" and the angular velocity $\omega$. Thereafter, the CPU 7 obtains the current position of the moving matter on the basis of the thus obtained moving direction and the moving distance or the like. Then, the CPU 7 processes the information such that the obtained current position of the moving matter can be displayed superimposed over the map information taken from a CD-ROM device 8, then outputs the processed information to a display device 9. An input device 10 is used in order to input an initial position of the moving matter, to change an operation mode of a navigation apparatus or the like.

(2) Theory for Detecting Angular Velocity

Figure 3:
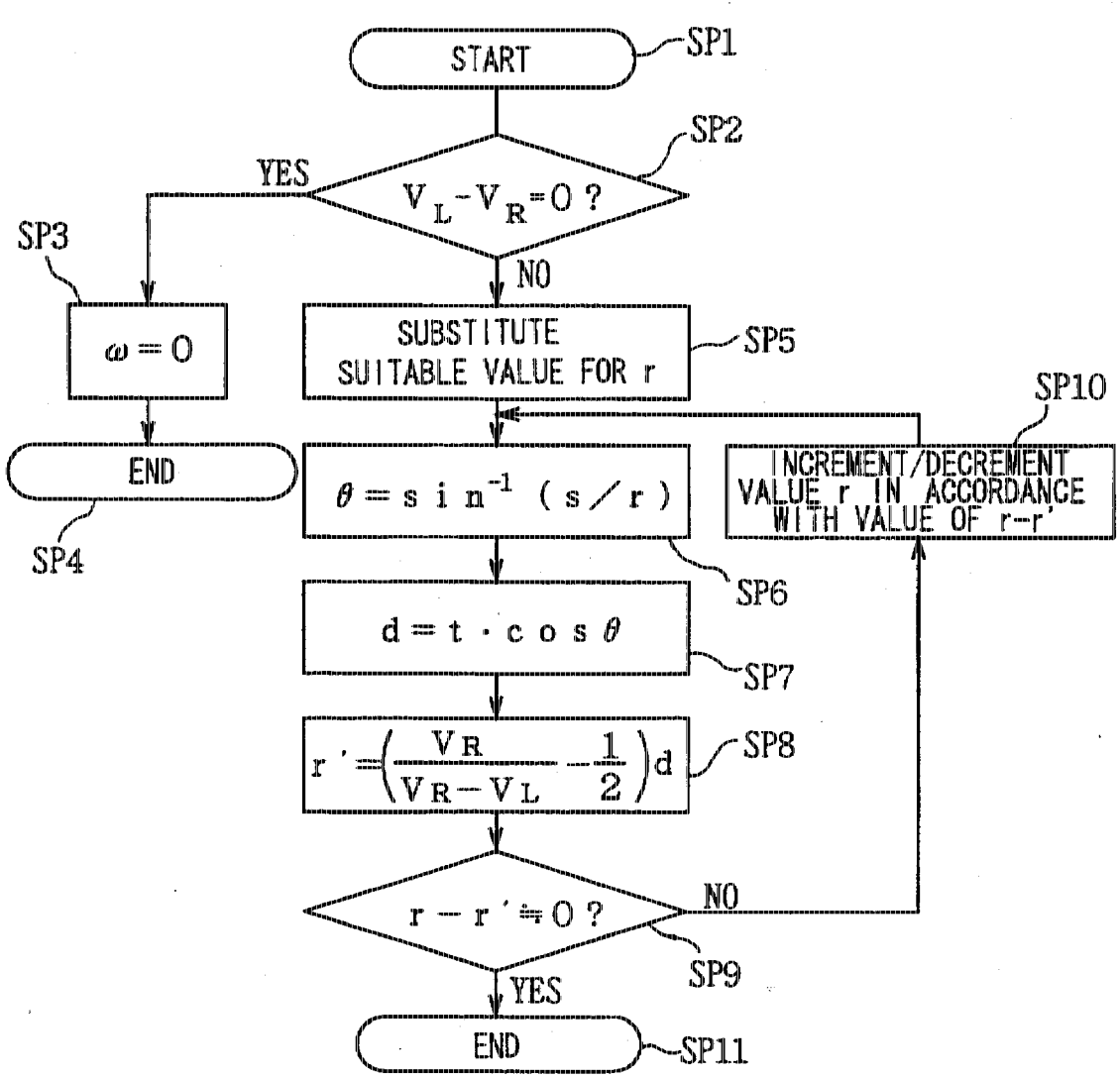
FIG. 3 is a flow chart showing a signal processing procedure in a calculation processing unit (concretely, obtain rotation radius r)

When the calculation processing unit 4 receives the velocity information $v_L$ and $v_R$ of the moving matter obtained by the velocity detectors 2 and 3 at measuring points L and R, the calculation processing unit 4 starts the processing of obtaining a rotation radius "r" of a center point between the measuring points L and R in accordance with the procedure of FIG. 3. This is because a distance "d" between projected points L' and R' is necessary to obtain the angular velocity $\omega$, and the rotation radius "r" is necessary to obtain the distance "d". In this respect, the projected points L' and R' are points on a rotation radius line which are obtained by projecting the measuring points L and R on the rotation radius line, respectively, and the rotation radius line passes through a center point between the measuring points L and R and extends from the rotation center of the rotation radius "r" along radial direction.

$$\omega = \frac{v_L - v_R}{d} \tag{1}$$

Figure 5:
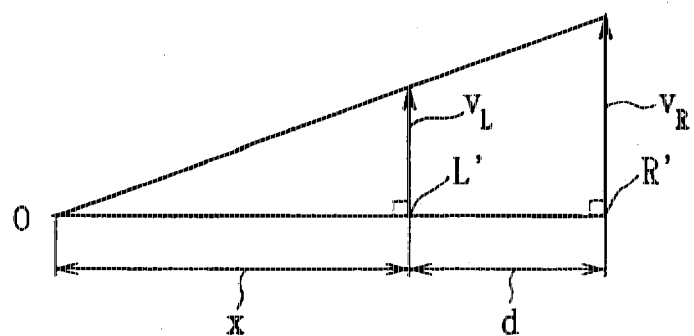
FIGS. 4 and 5 are schematic diagrams explaining a calculation theory in the case of obtaining an angular velocity on the basis of velocity information measured at two points on a moving matter or in the vicinity of the moving matter.

The angular velocity $\omega$ can be obtained by using the expression (1) by the following reason. As shown in FIG. 5, assuming that a distance from a rotation center O to the projected point L' is "x", and the velocity information obtained at the projected points L' and R' is "$v_L$" and "$v_R$", respectively, there is a relationship represented by the following expression (2) between distances from the rotation center O and the velocity.

$$v_L : v_R = x : (x+d) \tag{2}$$

A relation of $x \cdot v_R = v_L \cdot (x+d)$ is obtained by modifying the expression (2), and hence the distance "x" can be obtained as shown in the following expression (3).

$$x = \frac{v_L \cdot d}{v_R - v_L} \tag{3}$$

The angular velocity $\omega$ is represented by the following expression (4) by using the distance "x".

$$\omega = \frac{v_L}{x} \tag{4}$$

Then, the expression (1) is obtained by substituting the expression (3) for the "x" in the expression (4).

It would have been understood from these expressions that the angular velocity $\omega$ is obtained if the distance "d" between the projected points L' and R' is obtained. However, the distance "d" is a parameter determined depending on a rotation angle $\theta$ and hence not given as a fixed value. In view of this fact, two relational expressions in addition to a relational expression between the rotation radius "r" and the distance are prepared.

At first, a relational expression between the rotation radius "r" and the distance "d" is obtained as the first relational expression. For this purpose, a distance "x+d" from the rotation center O to the projected point R' is obtained from the following expression (5) by using the expression (3).

$$x + d = \frac{v_L \cdot d + (v_R - v_L)}{v_R - v_L} \tag{5}$$
$$= \frac{v_R \cdot d}{v_R - v_L}$$

Since the rotation radius "r" is represented as a length obtained by subtracting a half of the distance "d" (that is, d/2) from the distance "x+d" from the rotation center O to the projected point R', the first relational expression is obtained as shown in the following expression (6).

$$r = (x+d) - \frac{d}{2} = \left( \frac{v_R}{v_R - v_L} - \frac{1}{2} \right) \cdot d \tag{6}$$

In this regard, since the rotation radius "r" cannot be measured, a second relational expression having no rotation radius "r" is obtained in the following manner.

Supposing that a crossing angle between a line connecting the measuring points L, R and a line connecting the rotation center O to the center point between the measuring points L, R is $\theta$, the distance "d" between the projected points L' and R' is represented by the following expression (7) by using a known distance "t" between the measuring points L and R.

$$d = t \cdot \cos \theta \tag{7}$$

This expression is the second relational expression.

Figure 4:
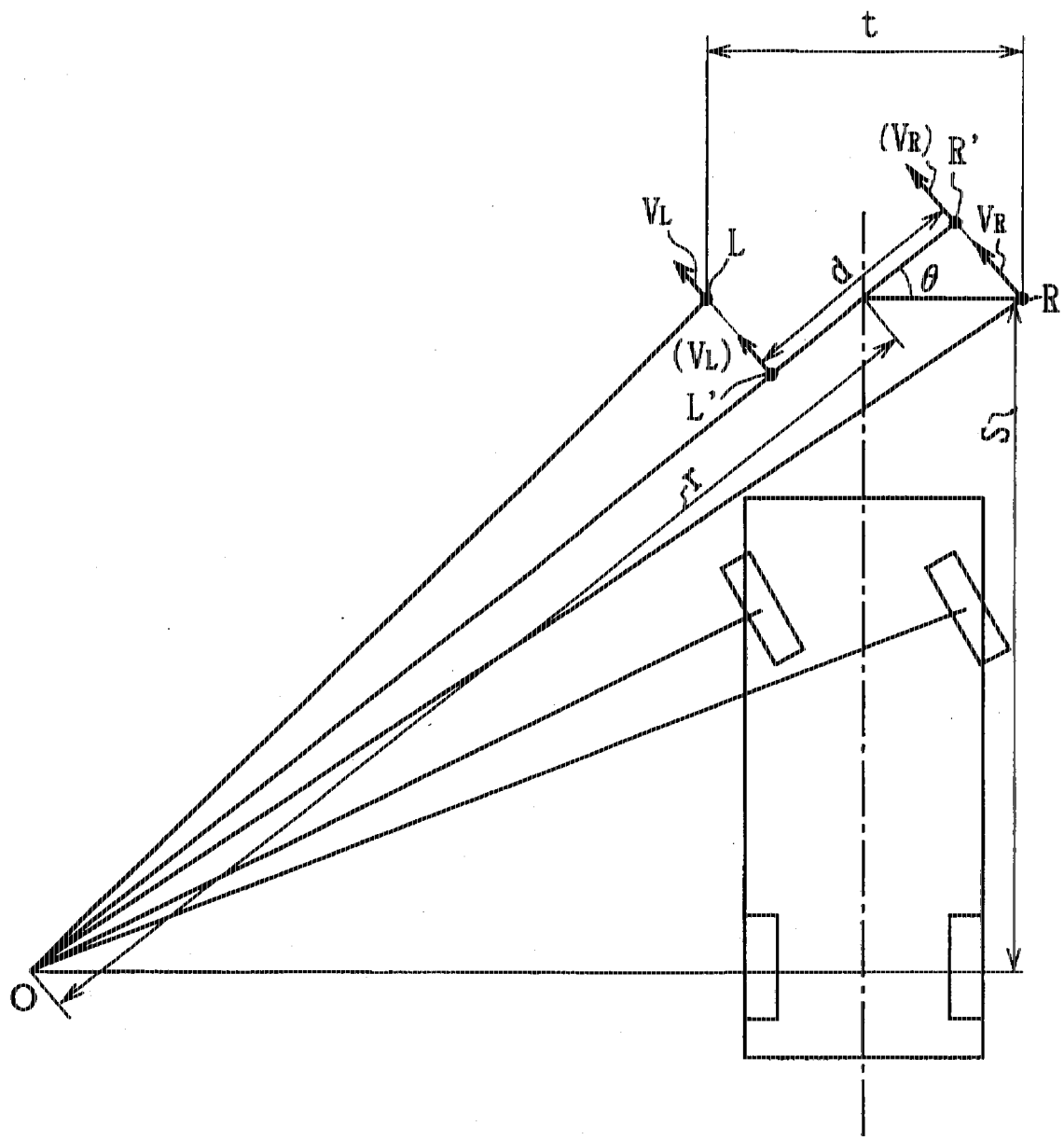

This angle $\theta$ appeared in the expression (7) can be obtained, as shown in FIG. 4, from the following expression (8) when a distance S is defined as a length from an axle shaft of a rear wheel to the measuring points L and R.

$$\theta = \sin^{-1} (S/r) \tag{8}$$

This expression is the third relational expression.

However, the unknown rotation radius "r" appears again in the expression (8), so that no values can be specified. For this reason, the calculation processing unit 4 substitutes a suitable value for the rotation radius "r" in the expression (8) to obtain the angle θ. The obtained angle θ is substituted in the expression (7) to obtain the distance "d" between the projected points L' and R'. When the value of the rotation radius "r" used for the first substitution does not coincide with the value which is obtained by substituting the distance "d" obtained by the expression (7), it is determined that the value used for the first substitution is not suitable. Then, the value of the rotation radius "r" is updated until a value of the rotation radius "r" used for substitution coincides substantially with a value of the rotation radius "r" obtained by the calculation, to thereby obtain a suitable value of the rotation radius. Thereafter, the angular velocity ω is obtained from the expression (1) by using the finally obtained rotation radius "r". The aforesaid procedure is the theory of the embodiment.

(3) Process for Detecting Angular Velocity

In the aforesaid arrangement, the angular velocity detecting operation of the moving matter by the angular velocity calculating apparatus 1 will be explained mainly as to the processing procedure shown in FIG. 3.

When the velocity information $v_L$ and $v_R$ measured by the velocity detectors 2 and 3 is input to the calculation processing unit 4, the calculation processing unit proceeds its processing to step SP2, where it is determined whether or not the two velocities $v_L$ and $v_R$ are the same.

When an affirmative result is obtained (that is, $v_L = v_R$) at step SP2, the calculation processing unit 4 proceeds its processing to step SP3, where it is determined that the angular velocity ω is zero. Then, the process proceeds to step SP4, where the operation for the angular velocity measurement at this time is terminated.

In contrast, when a negative result is obtained (that is, $v_L$ is not equal to $v_R$) at step SP2, the calculation processing unit 4 proceeds its processing to step SP5, where a suitable value is substituted for the rotation radius "r" at the center point of the measuring points L and R.

Then, the angle θ is obtained from the expression (8) on the basis of the suitable value of the rotation radius "r" used for the substitution (step SP6). Thereafter, the obtained angle θ is substituted in the expression (7) to obtain the distance "d" between the projected points L' and R' (step SP7). Further, this obtained distance "d" is substituted in the expression (6) to obtain a rotation radius r' (step SP8).

When the rotation radius r' is obtained at step SP8 in this manner, the calculation processing unit 4 determines whether or not the obtained rotation radius r' coincides substantially with the suitable value of the rotation radius "r" which was used for the substitution at step SP6 (step SP9).

When a negative result is obtained (that is, when the rotation radius r' obtained at step SP8 differs from the suitable value of the rotation radius "r" which was used for the substitution at step SP6), the process proceeds to step SP10, where a value corresponding to a difference (=r−r') between the two rotation radii r' and r is added to the suitable value of the rotation radius "r" which was used for the substitution in step SP6 to thereby change the value "r". Then, the processing returns to step SP6 to repeat again the procedure for calculating the rotation radius r'. This procedure is repeated until an affirmative result is obtained at step SP9.

In due course, when an affirmative result is obtained at step SP9 (that is, when the value of the rotation radius "r" used for the substitution at step SP6 substantially coincides with the value of the rotation radius r' calculated at step SP8), it is determined that the value used for substitution in step SP6 is a desired value. Then, the processing proceeds to step SP11, where the operation at this time is terminated.

At this step, the calculation processing unit 4 outputs the obtained rotation radius "r" to the angular velocity calculating unit 6. The angular velocity calculating unit 6 obtains an angle θ by substituting the thus obtained rotation radius "r" in the expression (8), then obtains a distance "d" by substituting the obtained angle θ in the expression (7). Thereafter, the angular velocity ω is calculated on the basis of the expression (1).

The thus obtained angular velocity ω is supplied to the CPU 7, where the obtained angular velocity is used for detecting the position of the moving matter.

According to the above configuration, the angular velocity ω can be obtained from the measured results of the velocity detectors 2 and 3 which have no possibility that an offset component is superimposed on a detected value like the conventionally employed various kinds of gyroscopes. Thus, it is possible to obtain the angular velocity calculating apparatus 1 which is cheaper and higher in accuracy as compared with the conventional ones.

Further, noise components generated from the velocity detectors 2 and 3 at the time of a stationary state are smaller as compared with the conventional various kinds of gyroscopes, so that it is possible to provide the angular velocity calculating apparatus capable of measuring very small angular velocity accurately.

(4) Other Embodiments

The aforesaid embodiment have been dealt with the case where the radio wave transmitter/receiver 2A and the antenna 2B are employed as the velocity detectors 2 and 3. However, the present invention is not limited thereto but velocity detectors using other theory can be employed.

Further, the aforesaid embodiment have been dealt with the case where a pair of the velocity detectors 2 and 3 are mounted symmetrically with respect to a center axis which passes through the center of the moving matter and extending along the straight moving direction of the moving matter. However, the present invention is not limited thereto but a pair of the velocity detectors can be mounted in any mutual positional relation so long as they are mounted at two portions on the moving matter or in the vicinity thereof. The angular velocity ω can be obtained on the basis of the aforesaid theory regardless of any mutual positional relation of a pair of the velocity detectors.

Furthermore, the aforesaid embodiment have been dealt with the case where a pair of the velocity detectors 2 and 3 are mounted at the front positions of the moving matter with respect to the moving direction thereof. However, the present invention is not limited thereto but a pair of the velocity detectors can be mounted at the side or rear portions of the moving matter.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A navigation apparatus for a mobile vehicle, comprising:

plural velocity detectors each for detecting a velocity of the moving vehicle;

processing means for deriving a value of a parameter determining an angular velocity of said moving vehicle;

angular velocity calculating means for calculating the velocity of said moving vehicle based on the value of said parameter from said processing means;

velocity calculating means for calculating a mean velocity of said moving vehicle from outputs of said plural velocity detectors;

digital storage means for storing digital map data;

display means for displaying a map and a position of said vehicle on said map; and a central processing unit for calculating a position of a vehicle based on said angular velocity determined by said angular velocity calculating means and said mean velocity determined by said velocity calculating means, for reading digital map data from said digital storage means, and for generating an output signal to said display means so that said display means displays said map and said position of said vehicle on said map.

2. The navigation apparatus for a mobile vehicle according to claim 1, wherein each of said velocity detectors comprises:

a transmitter for transmitting a first electro-magnetic wave;

a receiver for receiving a second electro-magnetic wave, said second electro-magnetic wave being generated by reflecting said first electro-magnetic wave off of a surface; and an antenna coupled to both said transmitter and said receiver.

3. The navigation apparatus for a mobile vehicle according to claim 1, wherein said processing means derives the value for a radius of movement of said moving object.

4. The navigation apparatus for a mobile vehicle according to claim 3, wherein said processing means derives the value for the radius of movement by using a first value of the radius, calculating an angle of said movement with the first value of the radius, calculating a distance of a projection between said plural velocity detectors, calculating a second value of said radius, and comparing the first value of said radius with said second value.

5. An angular velocity calculating method, comprising the steps of:

detecting plural velocities of a moving matter at plural positions on said moving matter, respectively;

deriving a value of a parameter which determines an angular velocity of the moving matter; and calculating an angular velocity of the moving matter based on the value of the parameter, wherein said deriving step comprises the steps of:

deriving a first value for the radius;

calculating an angle of movement of the moving matter;

calculating a distance of a projection between the plural velocity detectors;

calculating a second value of said radius; and comparing a value of said first value of said radius with the second value of said radius.

6. The angular velocity calculating method according to claim 5, wherein said step of detecting plural velocities comprises the steps of:

transmitting a first electro-magnetic wave;

receiving a second electro-magnetic wave, said second electro-magnetic wave being generated by reflecting the first electro-magnetic wave off of a surface; and calculating the velocity of said moving matter from the second electro-magnetic wave by considering Doppler effect.

7. The angular velocity calculating method according to claim 5, wherein said step of calculating the angular velocity comprises the steps of:

calculating an angle of movement of the moving matter by a following formula $$\theta = \sin^{-1}(S/r),$$

where S is a distance from a back edge of said moving matter to a point of measure of said velocity and r is said radius;

calculating a distance of a projection between plural velocity detectors by a following formula $$d = t \cos \theta;$$

where t is a distance between plural velocity detectors; and calculating the angular velocity by a following formula $$\omega = (v_L - v_R)/d$$

where $v_L$ and $v_R$ are velocities detected by two of said plural velocity detectors, respectively.

8. The method as set forth in claim 5, wherein said step of comparing determines whether a difference between the second value of the radius and the first value of the radius is approximately equal to zero.

9. The method as set forth in claim 8, wherein if the difference is not approximately equal to zero, then said method further comprises the steps of deriving a third value of the radius based on the difference, calculating a second angle of movement with the third value of the radius, calculating the distance of the projection between the plural velocity detectors with the second angle, calculating a fourth value of the radius, and determining whether a difference between the third and fourth values of the radius is approximately equal to zero.

10. A navigation apparatus, comprising:

first and second velocity detectors mounted on a vehicle for acquiring first and second velocities of said vehicle;

a velocity calculating unit for determining a mean velocity of the vehicle based on the first and second velocities;

a processing unit for deriving a radius of movement of the vehicle based on the first and second velocities;

an angular velocity calculating unit for determining the angular velocity of the vehicle based on the radius of movement derived by the processing unit;

a central processing unit for obtaining a current position of the vehicle based on the mean velocity of the vehicle and the angular velocity of the vehicle;

a storage device for storing map information; and a display;

wherein said central processing unit reads map information from the storage device and provides data to the display so that the display indicates the current position of the vehicle superimposed on the map information.

11. The navigation apparatus as set forth in claim 10, wherein said storage device comprises a CD-ROM.

12. The navigation apparatus as set forth in claim 10, further comprising an input device for receiving an initial position of the vehicle.

* * * * *